United States Patent [19]

Beale

[11] Patent Number: 5,393,117
[45] Date of Patent: Feb. 28, 1995

[54] METHOD AND APPARATUS FOR LIFTING A VEHICLE LOAD COVER

[76] Inventor: Aldon E. Beale, 8282 S. Gaylord Cir., Littleton, Colo. 80122

[21] Appl. No.: 109,388

[22] Filed: Aug. 19, 1993

[51] Int. Cl.$^6$ ............................................. B60J 7/00
[52] U.S. Cl. ................................. 296/100; 296/104
[58] Field of Search ............ 296/100, 110, 120.1, 296/118, 101, 104; 105/377

[56] References Cited

U.S. PATENT DOCUMENTS

| | | | |
|---|---|---|---|
| 2,877,722 | 3/1959 | Peat | 105/377 |
| 2,974,999 | 3/1961 | Stuart | 296/105 |
| 3,379,468 | 4/1966 | Woodward | 296/100 |
| 3,514,152 | 5/1970 | Hermon | 296/137 |
| 3,773,379 | 11/1973 | Loiseau | 296/107 |
| 3,806,185 | 4/1974 | Brandjord | 296/98 |
| 3,841,697 | 10/1974 | McFarland | 296/100 |
| 4,168,096 | 9/1979 | Langston | 296/100 |
| 4,248,475 | 2/1981 | Johnson | 296/100 |
| 4,265,479 | 5/1981 | Langston | 296/100 |
| 4,625,654 | 12/1986 | Kuss et al. | 105/377 |
| 4,823,707 | 4/1989 | Salsbury | 105/377 |
| 4,823,708 | 4/1989 | Wymer et al. | 105/377 |
| 4,854,633 | 8/1989 | Kraft | 296/104 |
| 5,076,174 | 12/1991 | Martin | 105/377 |
| 5,211,441 | 5/1993 | Barkus et al. | 296/100 X |

FOREIGN PATENT DOCUMENTS

567130  2/1924  France .................. 296/100
3999  of 1885  United Kingdom .

Primary Examiner—Joseph Pape
Attorney, Agent, or Firm—Chester E. Martine, Jr.

[57] ABSTRACT

Methods of and apparatus are provided for placing a cover lifter at a position at which a cover for a load-carrying vehicle (such as a standard gondola car) must be lifted to form a non-load-formed peak. A web is quickly installed, and need be installed only at the locations at which there is a valley in the load. The web is placed transversely across the car generally in the horizontal plane of the top of the car. The web supports the cover lifter which is initially (during placing of the cover over the web and the loaded car) flat and generally in the plane of the top of the car. After placing the web tightly on the car, and then securely tying the cover to the car over the web, the cover lifter is raised and causes the cover to stretch in a controlled manner and form a lifter-peak, which is a non-load-formed peak at just the location at which the load did not form such a load-formed peak, but did form a valley.

11 Claims, 8 Drawing Sheets

METHOD AND APPARATUS FOR LIFTING A VEHICLE LOAD COVER

BACKGROUND OF THE INVENTION

1. Field of the Invention

This invention relates to methods of and apparatus for forming peaks in a cover for a freight-carrying vehicle, and more particularly, to positioning a cover lifter at axial locations along the vehicle immediately following loading of the vehicle and observing the load to determine those locations at which one or more peaks need to be formed in the cover for transit, e.g., to tighten the cover and enable it to shed liquid during transit.

2. Discussion of Prior Vehicle Cover Supports

There are many types of open-top vehicles which are designed for carrying loads. For example, ocean-going barges, grain trucks and railroad gondola cars are all used to carry diverse loads. Some such loads are loose and form piles when dropped into the vehicle. Other loads include discrete rigid items (e.g., rolls of steel), which take up less than all of the space in the vehicle. In this case, each discrete rigid item of the load is in effect a pile in the vehicle. Piles of such loose material or such items may naturally form a peak (a load-peak) which extends above the horizontal plane defined by the top of the vehicle. In each case, as used to describe prior cover supports and the present invention, the word "load" includes such loose loads, such discrete items, and other things that form a pile upon being placed in a vehicle.

Reference is here made to load-carrying vehicles which are used when connected to other similar vehicles (such as gondola-type railroad cars), since problems encountered in the loading of one of such cars is compounded by the fact that a group of the cars is assembled into a unit, and not until after loading and covering all of the cars of the unit is the unit released from an industrial track, for example, onto the yard track or the main line. Therefore, delays in loading and covering any one car of the unit will delay the release of the entire unit, which delay can be costly to both the shipper and the railroad. Further, such gondola cars are typical of many vehicles which carry loads that form load-peaks.

As noted, a unit of cars must be quickly loaded and covered. With cost factors limiting the number of people in a typical yard crew to three people, under some current yard guidelines, it must not take more than fifteen minutes to cover each car. Further, care must be taken to avoid placing uncontrolled stress on covers which protect the loads. Such uncontrolled stress often exceeds the design strength of the cover, weakening it and reducing the protection of the load otherwise provided by the cover. When a cover is placed on such a loaded car, the load-peak is effective to form a corresponding load-peak in the cover. The load-peak does not usually extend along enough of the axial length of the car to prevent valleys from forming in the load, and thus in the cover. A valley is a place at which the load does not extend upwardly through the horizontal plane at the top of the car. Thus, the top surface of a load valley is below such plane. Depending on the load, there can be one or more valleys in the load anywhere along the length of the car.

A cover on the load-peak and the valley can be subject to such uncontrolled stress as the covered valley collects snow and water. Further, even when there is no snow or water in the valley, the cover tends to be loose over the valley, and on reaching speed during transit, the motion of the car through the air causes the cover to flap uncontrollably at the valley, causing a different type of uncontrolled stress on the cover. It may be understood then, that if the railroad yard crew simply loads the car, and then covers the load using a tightly fitting standard car cover or tarp, there will most likely be at least one peak and many valleys in the cover. During transit of the so-covered car then, there are many conditions which will subject the cover to uncontrolled stress. If the cover is not thereby ruined or severely damaged, the snow or water can significantly increase the weight of the effective load (intended load plus snow/water) carried by the car. Such high effective load, greatly in excess of the intended load, increases operating costs to an intolerable extent.

Others have recognized that such loads should not only be covered, but that the cover should be supported from underneath to supplement the natural load-peaks. One example of such supplemental support is the use of a factory-assembled cage having a standard length. The cage is designed to fit over a central axial portion of the railroad car. To accommodate cars of different lengths, end trusses and axial adjustment arrangements have been used at the ends of the cover and the cage. These form the cover into a double-ply joint at the end of the car, and fill in the gap between the end of the cage and the end of the car. In one approach to using such a cage, a cover is mounted over the cage after an axially extending ridge line is tied to ribs of the cage to space the ribs at a uniform distance apart. Significantly, that distance is set at the factory before it is known what type of car, and what type of load conditions, will be experienced by the railroad yard crew in the actual use of the cover and the cage. While benefits are said to result from this approach, a substantial disadvantage is the time required to mount the entire cage on the car even if the load has formed many of the above-noted load-peaks. In other words, by having to choose between using the entire cage which the factory specified and assembled or not using any cage at all, the railroad yard crew is not given an opportunity to select a particular type of cover support which is needed for the particular load which has been placed in the car. Thus, a given size crew must spend too much time erecting the cage or trying to add to the number of members in the crew. If the crew does not use the cage to support the cover, the crew risks having the uncontrolled stress ruin the cover. With crew sizes limited, and shippers requiring that loads such as rolled steel be covered at all times, in using the pre-set cages, the limited size crew has to work too fast, risking injury. Further, the unnecessary parts of the cage add to the extra weight carried by the car, and increase the cost of the supports needed to keep the cover peaked over the load valleys. All of these factors add to operating costs without generating revenue.

As a result, there is still a need to provide a way to support a vehicle car cover to form one or more yard-crew-defined-peaks therein at axial locations selected by the yard crew working at the switch yard or other loading site.

Users of other vehicles have been faced with the need to form a compartment above the bed of a pick-up truck. In this situation, a false floor has been provided by hinged rigid doors above the true floor or bed of the pick up truck. The hinged doors allow access to the storage space of the compartment below the false floor, while providing a strong floor for use under a tent or similar structure mounted over the truck bed. In one such system, the doors combine to cover the entire bed of the truck. Brackets mounted on the top of the opposite walls of the truck are adjusted axially along those opposite walls. Corresponding brackets on opposite sides of the walls form a bracket pair. At each axial end of the doors, a rod/turnbuckle assembly extends across the open bed and has ends connected to the pair of brackets to support a central hinge beam extending from the bulkhead to the tailgate along the longitudinal axis of the truck bed. The beam has a hinge connected to the doors to allow the doors to pivot to an open position and provide access to the storage space under the doors.

There are numerous examples of vehicle cover supports which use transversely extending upwardly pre-arched ribs mounted on opposite walls of the vehicle. In some cases, the ribs are allowed to move out of the way of loading operations. However, such ribs do not solve the time problem, and because in general all of the ribs stay on the vehicle all of the time, the weight problem is not solved either.

SUMMARY OF THE INVENTION

It is clear that the need to provide the above-described compartment did not present the problem in which a load-carrying vehicle has various types of load conditions which are not known to a yard crew until the load is actually placed in the vehicle, and where a flexible cover, such as a tarp is typically then placed over the entire load. Also, even though such cages were used, and even though such flat doors were used to make the compartment, Applicant determined that there was still a need to provide a way to form a lifter-peak only at those axial locations at which a valley is formed because the load does not extend above the top plane defined by the sides of an open-top load-carrying vehicle such as a gondola car.

Whereas the pick-up truck solution taught placing two rigid doors over the entire length of the empty bed of a truck, Applicant has identified a need in the variable load situation to provide, at selectively located positions along a very long and randomly-loaded vehicle, a cover lifter able to be erected only at the valleys of the load.

Applicant has studied the loads ordinarily carried by typical open-top load-carrying vehicles. One study of railroad gondola cars indicated that in numerous situations, the intended load (the revenue-producing load) can be relied on during transit to keep the cover above such plane defined by the top of the car. As a result, upon completing the loading of the car, the work crew need only determine where else along the axial length of the car the cover should be lifted above such plane for transit. Such studies also indicate that it is necessary to overcome the disadvantages of the factory-formed cages because the limited-size yard crews cannot take the time needed to install a whole cage where an entire cage is not needed, and because of the waste of materials and the unnecessary weight thereof.

The present invention seeks to overcome these long-felt problems by providing methods of and apparatus for placing, at a position at which a vehicle cover must be lifted to form a non-load-formed peak, a web which is quickly installed, and which need be installed only at the locations of the load valleys. The web is placed transversely across the vehicle generally in the horizontal plane defined by the top of the vehicle. The web supports a cover lifter which is normally (during placing of the cover over the web and the loaded vehicle) flat and generally in such plane. After placing the web tightly on the vehicle, and then securely tying the cover to the vehicle over the web, the cover lifter is raised and causes the cover to stretch in a controlled manner and form a non-load-formed peak at just the location of a valley, where the load did not form such a load-formed peak.

In one embodiment of the present invention, the web is made from fabric which is stronger (less yielding to stretching forces) than the cover. Facilities are used to firmly tie the web to the vehicle in a transverse position. In such embodiment, the cover lifter is in the form of an I-beam pivotally secured to the web. A pull rope tied to the top of the I-beam forces the I-beam to rotate and forms therein a peak (a lifter-peak) at just the place where it is needed. Moreover, the lifter-peak supplements, rather than duplicates, any load-formed peaks by forming a desired lifter-peak only at axial positions selected by the yard crew.

In a further embodiment of the present invention, a method is provided for transforming a completely or partially planar railroad car cover surface. The surface is either flat or only partially flat due to a load-formed peak adjacent to one or more valleys. Such surface is transformed into a relatively complete three-dimensional surface (via one or more lifter-peaks) extending above such planar surface or valleys. The planar surface includes a planar perimeter defined by a pair of spaced, axially-extending sides and a pair of spaced ends transverse to such sides. As transformed, the three-dimensional surface is to have at least one such lifter-peak above the plane of such perimeter. Preferably, the planar surface to be transformed has a central load-formed peak, which inherently has one or more of the valleys.

The method of the present invention contemplates a series of steps, the first of which involves placing a flexible, fabric web transversely across the sides of the car at an axial position at which it is desired to define the lifter-peak (i.e., transversely aligned with a valley). The web has opposite ends, and with the web in the desired axial position, stretching of the web is performed to define a platform generally in the plane of the perimeter of the yet-to-be applied cover. With the web, or in a separate mounting step, there is provided a two dimensional cover lifter on the web. The lifter is initially positioned generally in that plane, which is over the valley. A cover-engaging peak-former of the cover lifter has a selected axial length that is short relative to the axial length of the car. The peak-former tool is supported by a column having a length selected according to how far above the platform is the desired elevation of the lifter-peak which is to be formed. Upon placing the cover on the car, the cover extends over the planar web surface and over the cover-lifter with the column and the peak-former tool thereof lying flat on the web in such plane. The pivotal mounting allows the peak-former tool and the column to be moved from the position in such plane to a peak-forming position generally perpendicular to such plane. A moving step moves the cover lifter from the initial planar position in such plane to the peak-forming position to cause the peak-former tool to form the lifter-peak and define the three dimensional surface as having the lifter-peak. If such a peak-forming tool is placed along the car at every valley, then without any interconnection of the cover lifters the natural load-peaks combine with the lifter-peaks to form a desired peak configuration which, for example, tightens the cover all along the length of the car, minimizing looseness of the cover and the resulting flapping as the car rolls. These peaks in the cover also reduce the accumulation on the cover of elements such as rain and snow.

In contrast to the prior cage which had a standard length, there is no "standard" length or use of the cover lifter devices because they are completely independent of each other and are not connected to the cover. In greater detail, one or more of the cover lifter devices may be used. Thus, the ideal use of the peak-former tools of the cover lifter is determined only once the crew at the car-loading site determines (1) where along the axial length of the car must the lifter-peaks be formed, and (2) thus how many cover lifter devices will be used. Then, without the need to take time to interconnect the cover lifters or the webs, the webs are separately installed on the car.

The present invention also seeks to provide methods of and apparatus for forming a lifter-peak at one or more locations after loading of a particular car.

The present invention further seeks to provide methods of and apparatus for allowing lifter-peaks to be placed along the axial length of the car at any desired location determined after loading of the car.

Improved formation of lifter-peaks in a cover placed on the car is provided by the present invention by using a randomly placeable platform to support cover lifters which include peak-former tools and a column pivotally secured to the web for movement into a cover lifting position to form a lifter-peak in the cover.

BRIEF DESCRIPTION OF THE DRAWINGS

Other features and advantages of the present invention will be apparent from an examination of the following detailed descriptions, which include the attached drawings in which.

DETAILED DESCRIPTION OF THE PREFERRED EMBODIMENTS

Loads 11 and Open Top Load-Carrying Vehicles 10

Figure 1:
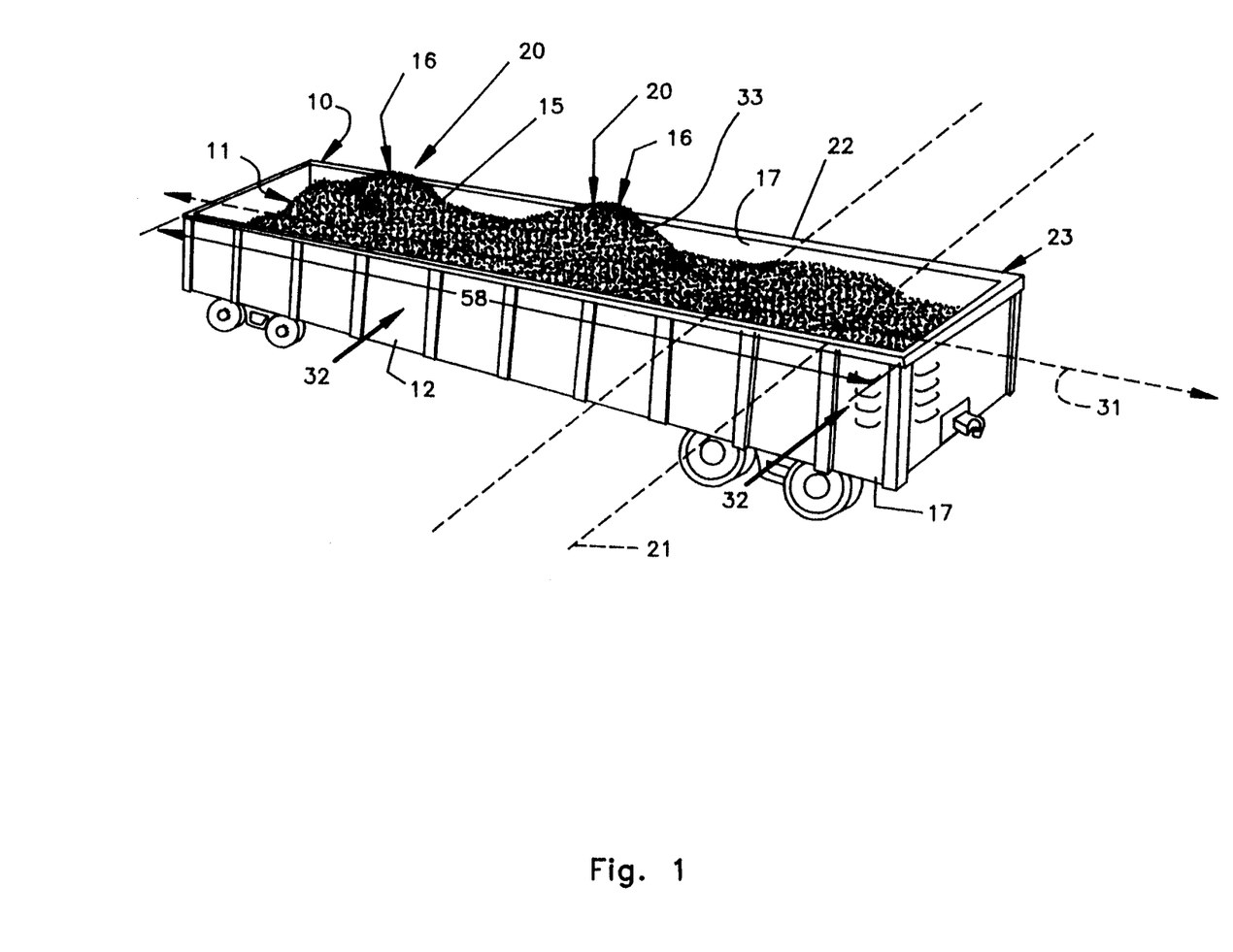
FIG. 1 is a three dimensional view of a standard size railroad gondola car, illustrating a typical load carried by such car, where lower parts of the load (valleys) are below a plane defined by the tops of the walls of the car, and where upper parts of the load extend above that plane and form load-peaks.

Referring to FIG. 1, there is shown one of many types of open-top vehicles 10 which are designed for carrying loads 11. A depicted gondola car 12 used on railroads is typical, in the sense of the present invention, of ocean-going barges (not shown) and grain trucks (not shown), for example, which are used to carry diverse loads 11. Some loads 11, such as the loose material 15 shown, are both loose and form piles 16 when dropped into the vehicle 10. Typical loose materials 15 include grain, gravel, municipal waste, ore, railroad ballast, scrap iron, and wood shavings, for example. These are carried in gondola cars 12 having four foot high sides 17. Other loads 11 (not shown) include discrete rigid items (e.g., large machinery and rolls of steel), which take up less than all of the space in the vehicle 10. These are carried in cars 12 having five and one-half foot high sides 17, for example. In the rigid load case, each discrete rigid item of the load 11 is in effect a pile 16 in the vehicle 10. The depicted piles 16 of such loose material 15 (or such items) may naturally form a peak 20 (which is here called a "load-peak") which extends above a horizontal plane 21 (shown in dashed lines in FIG. 1) formed by a top 22 or top perimeter 23 (FIG. 3) of the vehicle 10. In each case, as used to describe the present invention, the phrase "load 11" includes materials 15 such as the loose loads 11, such discrete items, and other things that form the pile 16 upon being placed in the vehicle.

In describing the present invention, reference is made to the gondola cars 12 as examples of load-carrying vehicles 10 which are used when connected to other similar vehicles 10 (such as another gondola-type railroad car 12). It is to be understood that problems encountered in the loading of one of such cars 12 is compounded by the fact that a group (not shown) of the cars 12 is assembled into a unit, and not until after loading and applying a cover 26 over each car 12 in the entire unit is the unit released from an industrial track (not shown), for example, onto a yard track or the main line (not shown). Thus, time saved in loading and covering each individual car 12 enables the whole unit to be released sooner.

Figure 2:
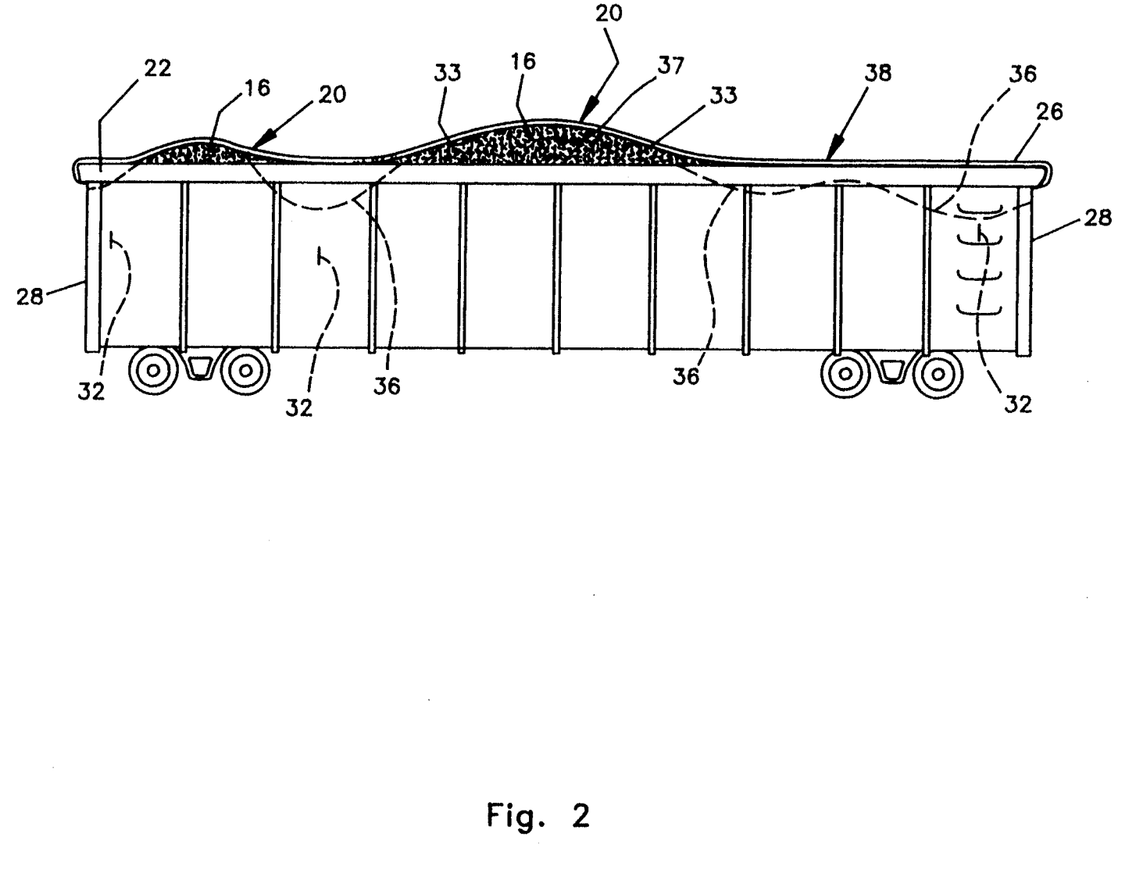
FIG. 2 is a side elevational view of such car, showing the axial locations along the length of the car at which a cover lifter of the present invention may advantageously be selectively mounted on such car at the loading site according to the nature and location of the load.
Figure 3:
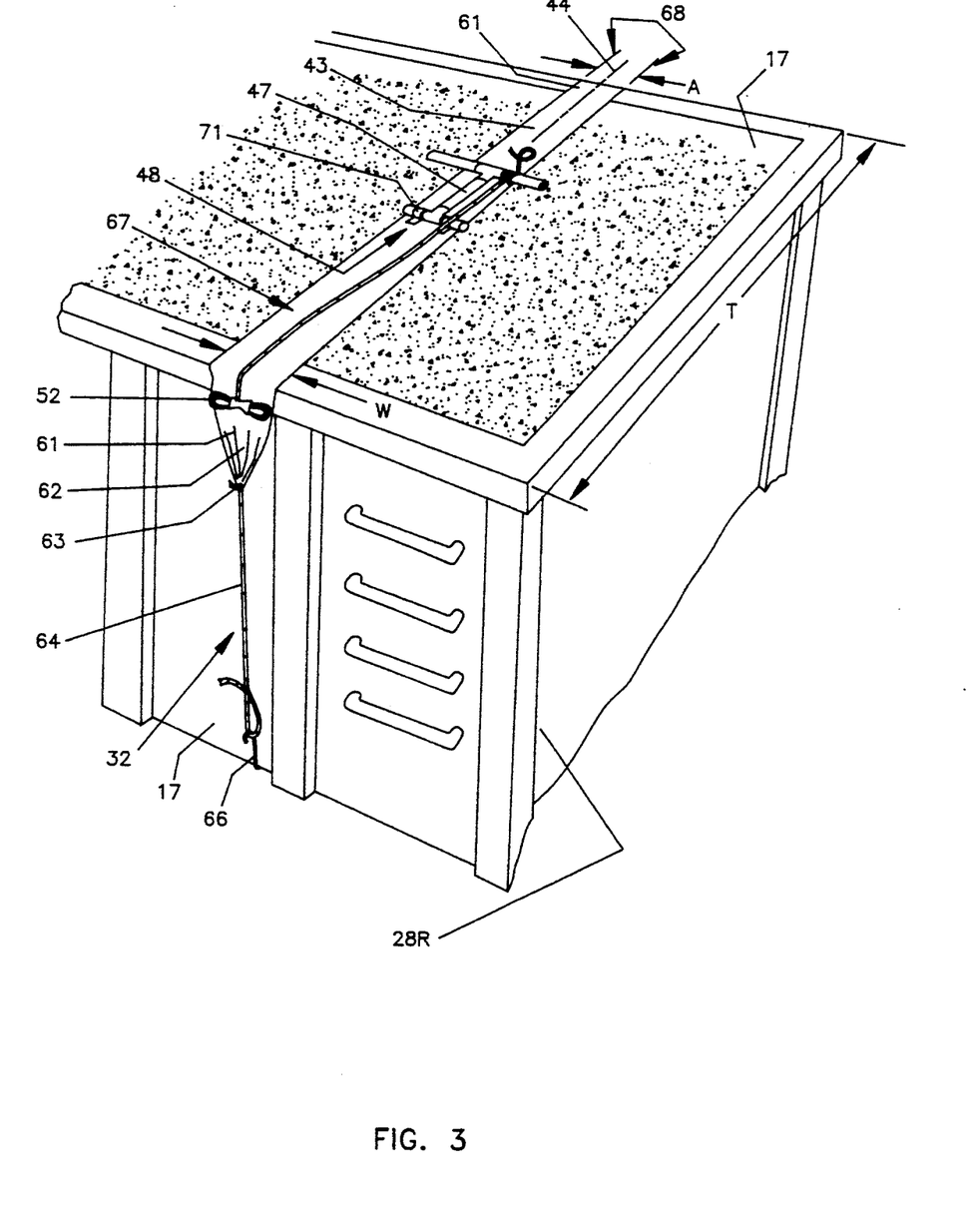
FIG. 3 is a perspective view showing a web extending transversely across the car from side to side and stretched to form a platform for supporting a cover lifter device, which is shown being on the web in an initial, flat, "down" or retracted position.
Figure 5:
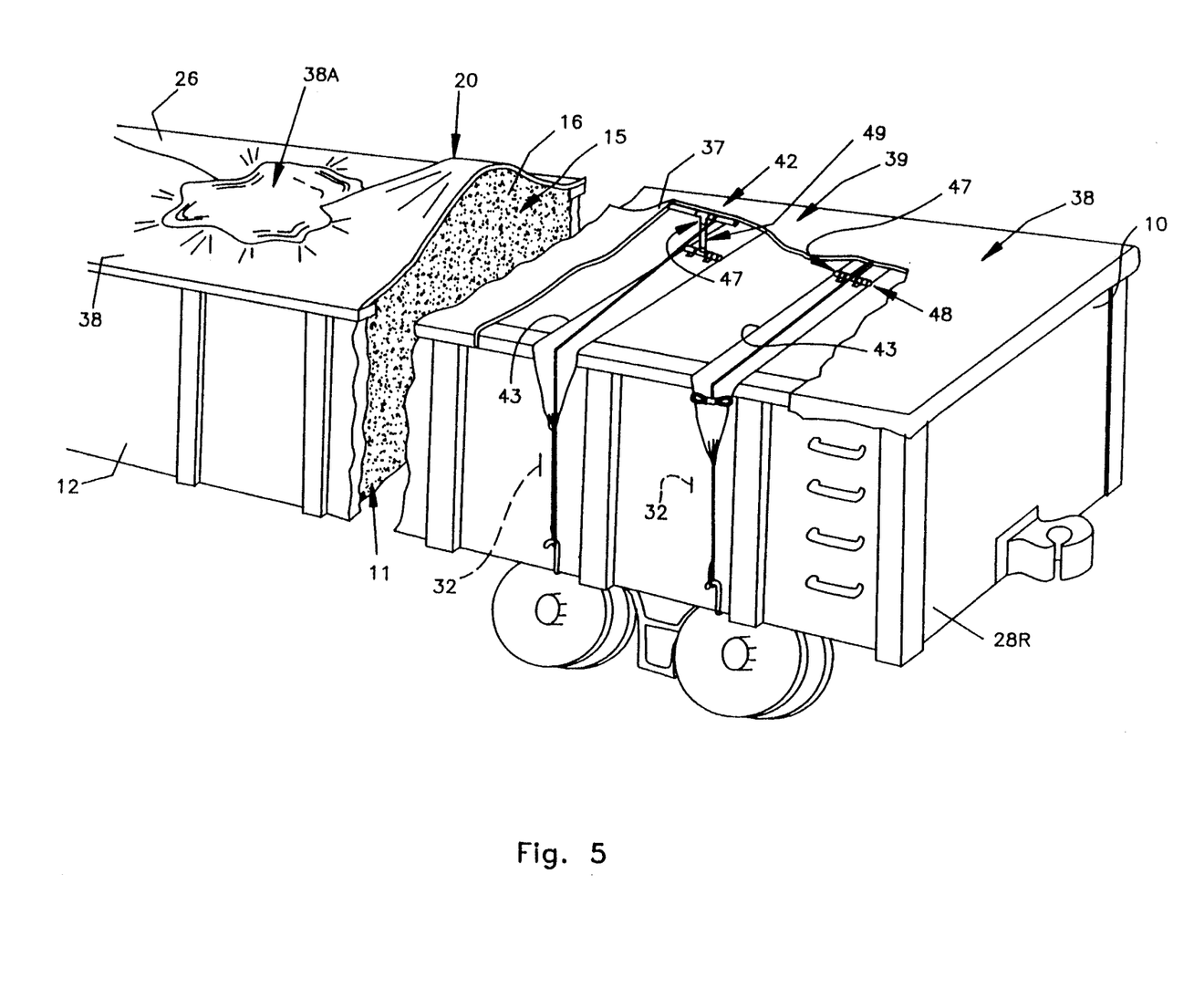
FIG. 5 is a perspective view showing lines tying two webs taut across opposite walls of the car, and one of the cover lifters thereon in a down position with the cover not yet transformed into a lifter-peak; and the other one of the cover lifters thereon tied by additional lines in an "up", cover-lifting and supporting position which has transformed the cover into a three-dimensional configuration having the lifter-peak.

In FIG. 1 a standard-size railroad gondola car 12 (appx. fifty-four feet by ten feet) is shown having opposite ones of the sides 17, opposite ends 28, and a longitudinal axis 31 along which there are numerous axial positions or locations (indicated by arrows 32 ). The tops 22 of the sides 17 and of the ends 28 define the horizontal plane 21. The car 12 is shown carrying a load 11 of loose material 15 which naturally forms the load-peak 20, having sloped sides 33 leading to a lower part, or valley 36, below the horizontal plane 21 (FIG. 3). The cover 26 is shown in FIG. 2 over the load 11. The natural load-peaks 20 stretch the cover 26 as at 37, but the cover 26 initially (without wind load or snow thereon) has a planar or flat surface in the horizontal plane 21 as shown at 38 in FIGS. 2 and 5. If permitted to remain as a planar surface, the surface 38 will flap or will sag under the weight of accumulating liquid, for example, as shown in FIG.5 as accumulation 38A.

Forming Lifter-Peaks 42 Using The Present Invention

The gondola car cover 26 is lifted to transform the planar surface 38 into a three-dimensional surface 39 (FIG. 5) characterized by one or more lifter-peaks 42, which is a non-load-formed peak, supplementing any load-formed peaks 20. For this purpose, a web 43 is quickly installed only at the axial locations 32 (FIG. 2) at which there are the valleys 36 in the load 11. The web 43 is placed on an axis (see line 44 in FIG. 3) transversely across the car 12 generally in the horizontal plane 21 of the perimeter 23 of the car 12. The web 43 supports a cover lifter 47 which is initially (during placing of the cover 26 over the web 43 and the loaded car 12) in a flat position 48 (shown in FIG. 4 and on the right side of FIG. 5) and generally in the horizontal plane 21. After placing the web 43 tightly on the car 12, and then securely tying the cover 26 to the car 12 over the web 43, the cover lifter 47 is raised into a lifting position 49 (shown in FIGS. 5 (left side), 6, 7A and 7B) and causes the cover 26 to stretch in a controlled manner and form the lifter-peak 42 at just the location(s) 32 at which the load 12 did not form the load-formed peak 20, but did form the valleys 36.

The Web 43 With The Cover Lifter 47

In one embodiment of the present invention, the web 43 is made from fabric which is stronger and less yielding to stretching forces than the cover 26. The web 43 is firmly tied to the car 12 in a position extending parallel to the transverse axis (line 44 in FIG. 3) across the car 12. In such embodiment, the cover lifter 47 is in the form of an I-beam 51 pivotally secured to the web 43. A pull rope 52 tied to a top 53 of the I-beam 51 forces the I-beam 51 to rotate and move an axially extending, but short, peak former tool 56 up against the tight cover 26. As a result, the peak former tool 56 stretches the tight cover 26 a controlled amount, and forms the lifter-peak 42 therein at just the location 32 where it is needed. Moreover, the lifter-peak 42 supplements, rather than duplicates, any load-formed peaks 20 by forming the desired lifter-peaks 42 only at the axial positions 32 of the valleys, as selected by the yard crew.

The Web 43

Figure 4:
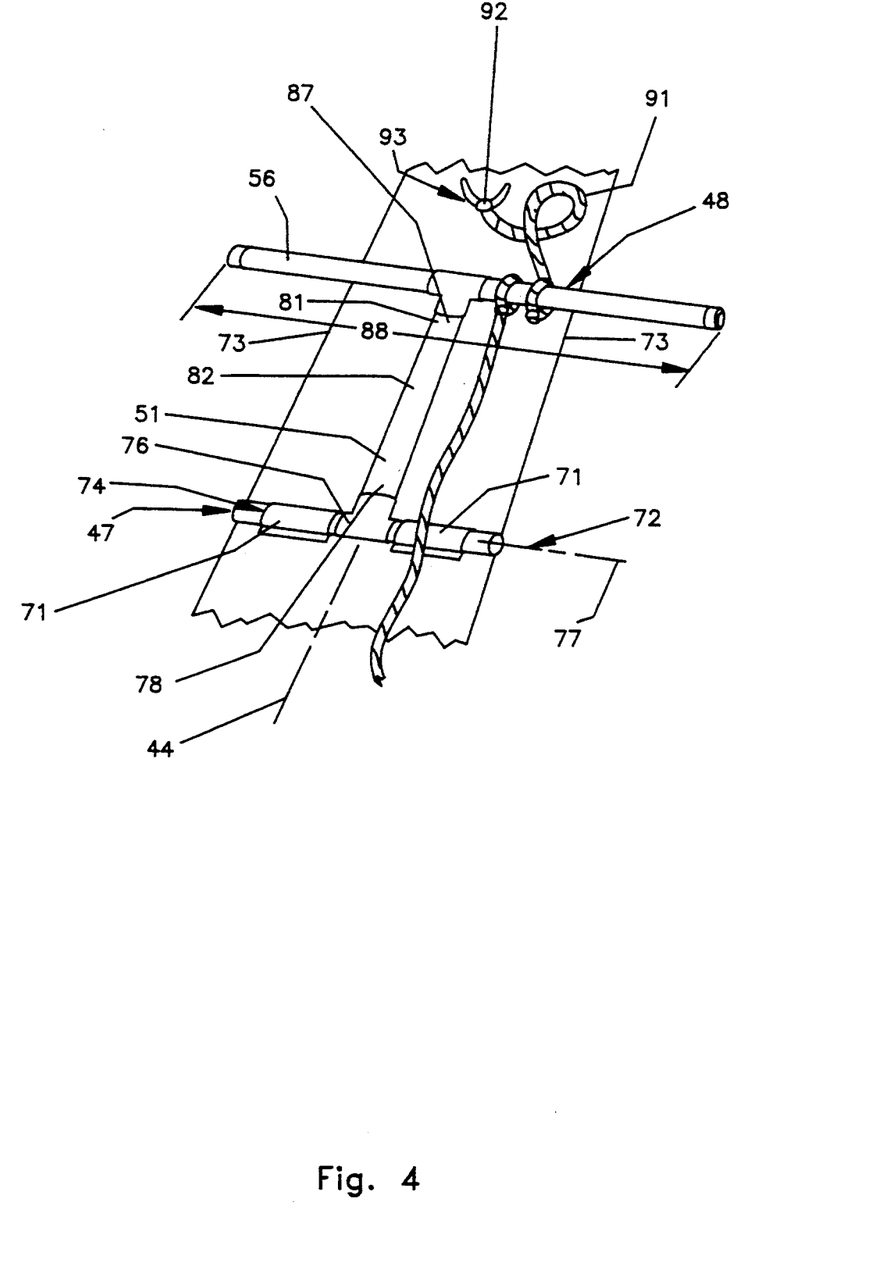
FIG. 4 is an enlarged view of a portion of the web shown in FIG. 3, illustrating the cover lifter in the down position, with attached pull and stop ropes for lifting the lifter and thus the cover at an axial location at which the load has not formed a load-peak in the cover, but has formed a valley.

Referring to FIG. 3, a right end 28R of the gondola car 12 is shown containing one of the valleys 36. The right hand dashed line 32 in FIG. 2 identifies the axial (or longitudinal) location 32 along the longitudinal length of the car 12 corresponding to this valley 36, which is the location at which one of the cover lifters 47 of the present invention may advantageously be selectively mounted on such car 12 at the loading site. FIG. 3 shows one web 43 extending parallel to the transverse axis 44 across the car 12 from one of the sides 17 to the other side 17 aligned with the location 32. The web 43 is made from multi-ply poly fabric material, such as nylon, polypropylene, or polyethylene. On the other hand, the cover 26 is made from only a single ply of the same or similar material, so that the web 43 is much more resistant to stretching under forces parallel to the axis 44 and to forces applied downwardly, such as perpendicular to the plane 21. The web 43 also has a twelve inch axial length A (along the longitudinal axis 31 of the car 12, which is a width W transverse to the web's longitudinal axis 44). When used with standard gondola cars 12 having a ten foot width T (FIG. 3), the web 43 is about thirteen feet long for the extent of its twelve inch width W. At each end 61 of the web 43 there is a tapered extension 62 which is about one foot long and terminates in an eyelet 63. One end of a line 64 is tied to the eyelet 63, and the other end of the line 64 is attached to an S hook 66 on the car 12 to render the web 43 taut and tightly secure the web 43 to the car 12. With these characteristics, the taut web 43 forms a platform 67 for supporting the cover lifter 47. Until the cover 26 is placed over the web, such width W of the web 43 in the axial direction 31 of the car 12 provides the taut web 43 with an effective amount of stability against twisting 68 (FIG. 3) on its longitudinal axis 44. The web 43 is adapted to support the cover lifter 47 in position vertically (FIGS. 6 and 7A) and against rotation 68 on the transverse axis 44 by providing loops 71 at locations 72 spaced in the direction of the longitudinal axis 31 of the car 12. The loops 71 are shown in FIG. 4 spaced one inch from edges 73 of the web 43, and each loop 71 is four inches wide by about six inches long, for example. Each loop 71 is secured to the web 43 as by sewing so as to leave an opening 74 sufficient to tightly receive a cylindrical hinge bar 76 of the cover lifter 47.

The Cover Lifter 47

Figure 6:
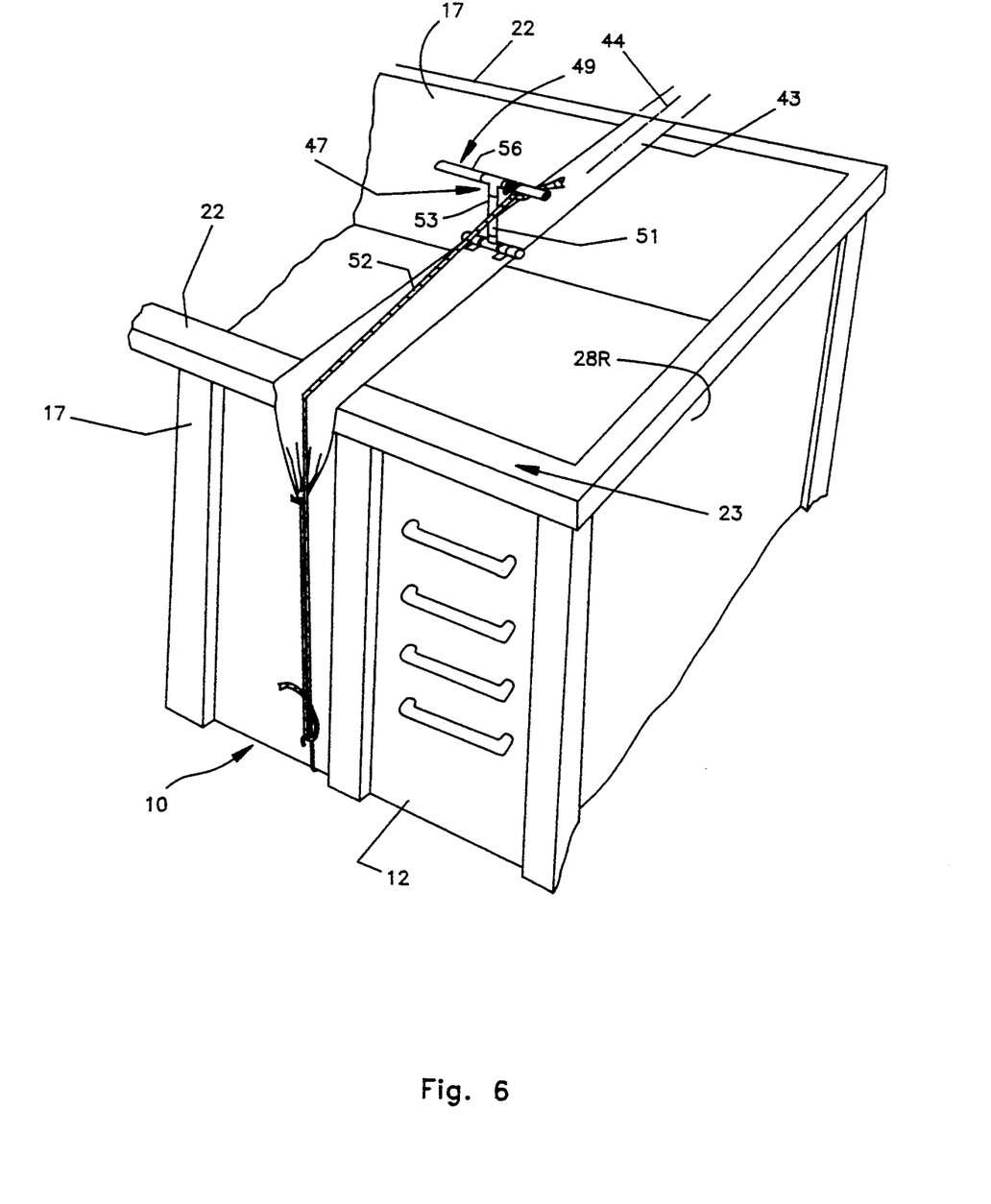
FIG. 6 is an enlarged view of a portion of FIG. 5, with the cover removed to show in more detail the cover lifter tied in the up position.

The cover lifter 47 is effectively two dimensional and is mounted on the web 43 preferably before the web 43 is stretched into the taut condition shown in FIG. 6. The cover lifter 47 is preferably generally in the shape of the I beam 51, and includes a base in the form of the hinge bar 76, which forms a pivot received in the loops 71 of the web 43 to rotatably secure the cover lifter 47 to the web 43. The hinge bar 76 is free to rotate around an axis 77 extending parallel to the car axis 31. Such rotation is from the initial or flat position 48 generally in the plane 21, to the peak-forming (lifting) position 49. One end 78 of a column 81 is attached to a mid-point 82 of the hinge bar 76. The column 81 has a length (see arrow 83 in FIG 7A which may vary, for example, according to the height of a particular load 11. For example, if twelve inches selected as a desired elevation or height (see arrow 84 in FIG 7B of the lifter-peak 42 to be formed, then the length 83 of the column 81 would be longer than twelve inches, e.g., sixteen inches, to allow the web 43 to stretch somewhat under the stress of the tight cover 37 (see web 43 in FIG. 7B) and still provide a net height 84 of twelve inches. The cover-engaging peak-former tool 56 of the cover lifter 47 is attached to another end 87 of the column 81. The tool 56 has a selected axial length (see arrow 88 in FIG. 6)

that is short (e.g., twenty-four inches) relative to the axial length (e.g., fifty-four feet) of the car 12.

Figure 7A:
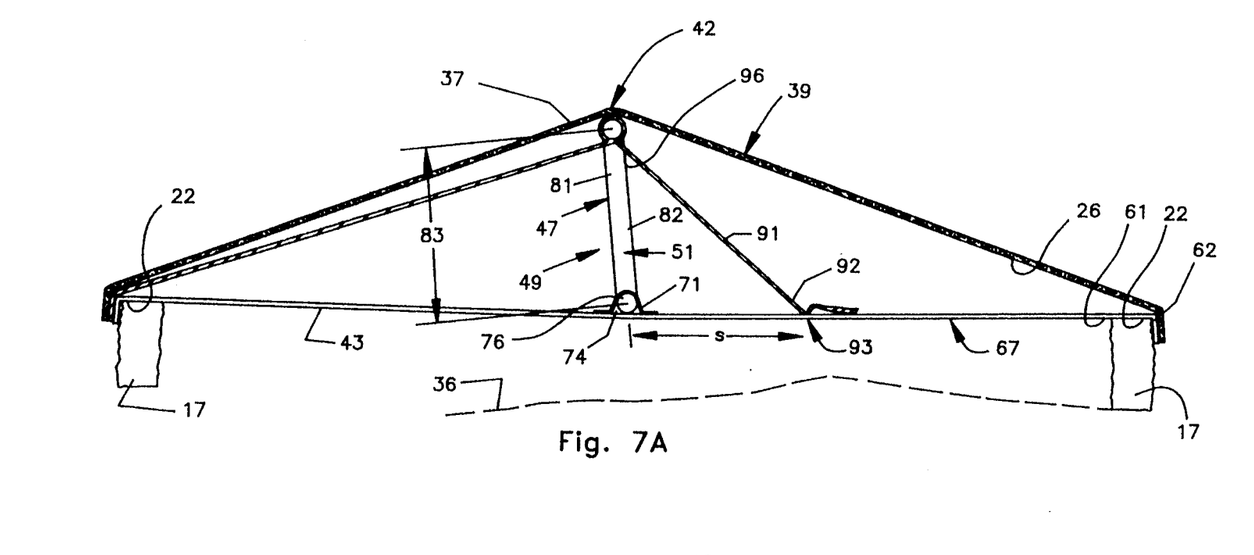
FIG. 7A is an end view showing the cover lifter in an initial lifting position.

Referring to FIG. 4, as noted, the cover lifter 47 is two dimensional so that it generally lies in the plane 21 of the web 43 in the down position 48. In this manner, the cover 26 may be tightly secured to the car 12 over the web 43 and the cover lifter 47. To enable the lifter-peaks 42 to be formed, the cover lifter 47 is provided with tie lines, including the pull rope 52 tied to the tool 56 or to the upper end 87 of the column 81. The pull rope 52 is long enough to extend from the tool 56 and axially (see arrow 44 in FIG., 4) under the cover 26 to and over the side 17 of the car 12 (see FIG. 3 where the pull rope 52 is coiled prior to being tied). The pull rope 52 extends over the side 17 long enough to be grasped by one of the crew. The pivotal mounting of the hinge bar 76 in the loops 71 allows the peak-former tool 56 and the column 81 to be moved from the down position 48 in the plane 21 to the peak-forming (lifting) position 49 shown in FIGS. 6 and 7A generally perpendicular to the plane 21. For this purpose, the crew member pulls on the pull rope 52 and rotates the hinge bar 76 on the axis 77. This causes the tool 56 to move upwardly under the cover 26 and stretch the cover 26 as shown in FIG. 7A. The cover 26 continues to be stretched as the pull rope 52 is pulled on. The column 81 eventually assumes the lifting position 49, which is a near-vertical position (see FIG. 7A), and the tool 56 is spaced above the web 43 by the length 83 of the column 81. Due to anticipated stretch of the web 43 in response to applying the controlled amount of stress on the cover 26 in lifting the cover lifter 47, the elevation of the lifter-peak 42 will be less, such as four inches less, than the length 83 of the column 81. Thus, the pulling on the pull rope 52 performs a moving step (see FIG. 8, step 107) to move the cover lifter 47 from the initial planar or flat, down position 48 in the plane 21 to the peak-forming position 49 to cause the peak-former tool 56 to define the three dimensional lifter-peak or surface 39.

Figure 7B:
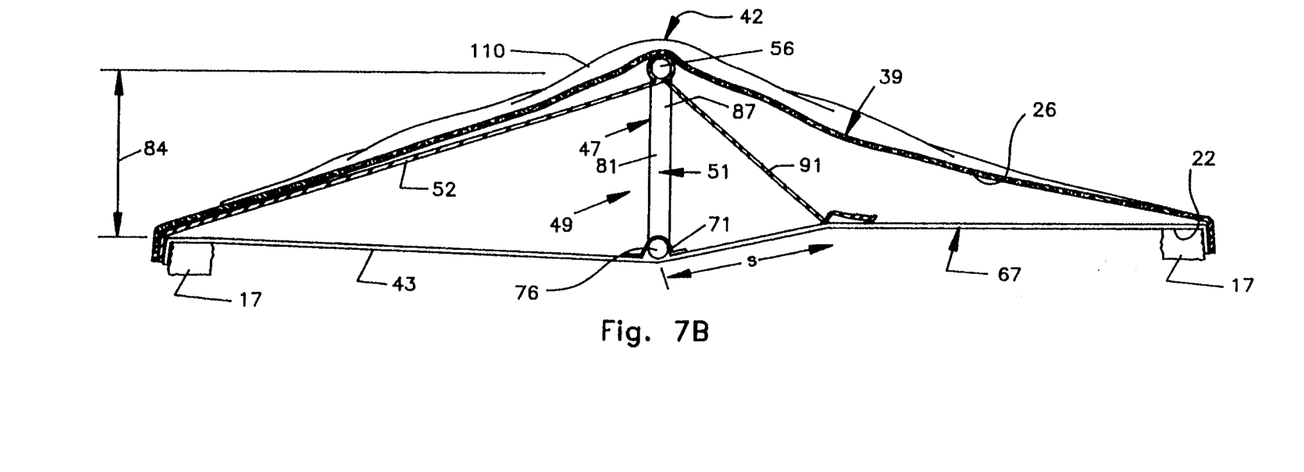
FIG. 7B is a view similar to FIG. 7A (where for clarity of illustration of the tie lines the cover is shown loose) showing the effect of the weight of accumulated elements (such as snow or ice) on the vertical height to which the cover is lifted by the cover lifter, which effect is to move the lifter into more of a vertical position to be better able to continue supporting the cover in an element shedding position.

The cover lifter 47 is also provided with a stop rope 91 for limiting the extent to which the pull rope 52 may rotate the hinge bar 76 on the axis 77. The stop rope 91 is tied or otherwise securely fastened at one end 92 to the web 43, as at a point 93. The other end 96 of the stop rope 91 is secured to the top end 87 of the column 81. As shown in FIG. 7A, with the column nearly vertical (about five degrees past vertical), the stop rope 91 is taut and functions to stop further rotation of the hinge bar 76 on the axis 77. As shown in FIG. 7A, there is a distance "S" between the point 93 and the hinge bar 76. This distance S is selected to keep the column 81 vertical even though an accumulation 110 of some of the elements, such as snow, may be slow in sliding down the slopes 33 of the lifter-peak 42. Referring to FIG. 7B, the effect of the weight of this accumulation 110 of the cover elements (such as the snow) is shown as moving the cover lifter 47 from the ninety-five degree lifting position (measured counterclockwise from the web 43) into about a ninety-degree lifting position 49.

Method of Transforming Planar Cover 38 Into Lifter-Peak 42

In a further aspect of the present invention, a method is provided for transforming one of the covers 26 having the completely or partially planar cover surface 38 shown in FIGS. 2 and 5. The surface 38 is either flat (as shown at the right end 28R of the car 12), or only partially flat (as shown by both the flat surface 38 and the load-formed peak 20 adjacent to one or more valleys 36). Such planar or partially planar surface 38 is transformed into the relatively complete three-dimensional surface 39 (by forming one or more of the lifter-peaks 42). In this manner, such three-dimensional surface 39 is formed by a combination of one or more of the lifter peaks 42, and one or more of the load-formed peaks 20 which the load 11 formed as a result of loading the car 12 with the materials 15. All of such peaks 20 and 42 extend to some extent above the plane 21 and above the valleys 36. As transformed, depending on the length of the car 12 and the nature and number of the natural load-formed peaks 20, the three-dimensional surface 39 is to have at least one such lifter-peak 42 above the plane 21.

Figure 8:
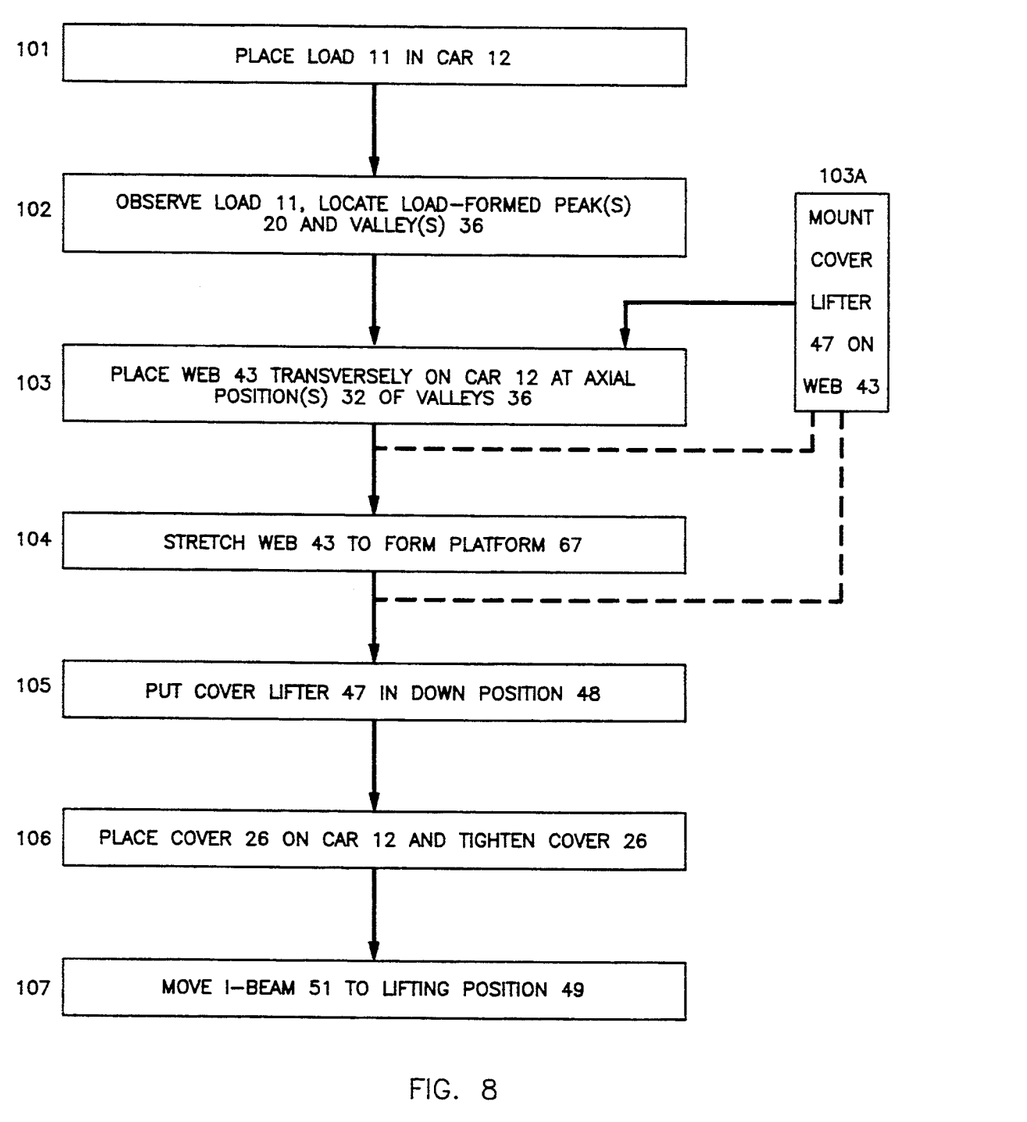
FIG. 8 is a diagram illustrating the steps in a method according to the principles of the present invention for providing lifter-peaks at selected axial locations along the length of a load-carrying vehicle, such as a standard railroad gondola car.

Referring to FIG. 8, the method of the present invention contemplates a series of steps, step 101 of which involves placing the load 11 in the car 12. In general, this naturally forms one or more load-formed peaks 20 and one or more valleys 36, although some materials 15 or load 12 may not extend at all above such plane 21. In that event, the surface 38 is completely planar.

Referring to step 102, the load 11, the load-formed peaks 20, if any, and the valley(s) 36 are observed and the axial location(s) 32 and the number of the valleys 36 are determined. Step 103 involves placing one of the flexible, fabric webs 43 transversely across the sides 17 of the car 12 at each axial position 32 at which it is desired to define one of the lifter-peaks 42 (i.e., at a valley 36).

Considering one web 43, with the opposite ends 61 of the web 43 placed in the desired axial position 32, a stretching step 104 is performed to stretch the web 43 and define the platform 67 generally in the plane 21 of the perimeter 23 of the yet-to-be applied cover 26. Provided with the web 43, or in a separate mounting step 103A there is provided, the two dimensional cover lifter 47 on the web 43. The cover lifter 47 is initially positioned generally in the plane 21 of the planar surface 38 (step 105), which is over a valley 36.

Upon placing the cover 26 on the car 12 (step 106), the cover 26 extends over the planar web surface 38 and over the cover-lifter 47 with the column 81 and the peak-former tool 56 thereof lying flat on the web 43 in the plane 21 of the planar surface 38.

Pivotal mounting (e.g., the original mounting of the lifter 47 on the web 43, or in separate step 103A) allows the peak-former tool 56 and the column 81 to be moved from the down position 48 in the plane 21 of the planar surface 38 to the peak-forming (lifting) position 49 generally perpendicular to the plane 21.

A moving step 107 then moves the cover lifter 47 from the initial flat planar position 48 to the lifting or peak-forming position 49. In such movement, the axially extending, but short, peak former tool 56 of the cover lifter 47 moves up against the tight cover 26. As a result of the known length 83, the peak former tool 56 stretches the tight cover 26 a controlled amount to apply a controlled amount of stress to the cover and forms the lifter-peak 42 as part of the three dimensional surface 39. If such a peak-forming tool 56 is placed along the car 12 at every valley 36, then any natural load-peaks 20 combine with the one or more lifter-peaks 42 to form a desired peak configuration which, for example, tightens the cover 26 all along the length of the car 12, minimizing looseness of the cover 26 and the resulting flapping thereof as the car 12 rolls. These peaks 20 and 42 in the cover 26 also prevent or reduce the accumulation (shown as snow 110 in FIG. 7B and a puddle 38A of water in FIG. 5) on the cover 26, since the slopes 33 formed by the cover lifter 47 start above the plane 21 and assist in allowing water, for example, to flow off the cover 26.

In contrast to the prior cages (not shown) which had a standard length, there is no "standard" length or use of the cover lifters 47 because they are completely independent of each other. In greater detail, one or more of the cover lifters 47 may be used. Thus, the ideal use of the peak-former tools 56 of the cover lifter 47 is determined only once the crew at the car-loading site determines (1) the location(s) 32 along the axial length of the car 12 at which the lifter-peaks 42 are to be formed, and (2) thus how many cover lifters 47 will be used. Further, although the dexterity and experience, for example, of different members of a yard crew may vary, in Applicant's experience, two reasonably experienced people can perform steps 103 through 105 in no more than six minutes on a standard size gondola car 12. Also, in about thirty minutes three people can perform steps 103 through 107 using three cover lifters 47 and one cover 26 to cover a load 11 in a standard size gondola car 12. Notwithstanding variations in the dexterity and experience, for example, of a reasonably experienced crew trained to use the above-described cage and cover to cover a similar car 12 and load 11, it appears to Applicant that three people would take much more time to cover a similar load 11 using such cage. With less amount of material provided as a part of the web 43 and the cover lifter 47, it may be understood that when the car 12 is to be unloaded, it is also relatively easy and quick to uncover the car 12 and remove the web 43, which removes the cover lifter 47 at the same time.

It is to be understood that the scope of the present invention is to be defined by the appended claims and not limited by the foregoing description, which describes the presently preferred ways in which the present invention may be embodied. Numerous other embodiments may be devised and still come within the scope of the present invention.

What is claimed is:

1. Apparatus for defining a peak configuration above a horizontal plane defined by the uppermost edges an open top container for a load, said peak configuration having an upper portion above said plane and being locatable at one or more selectable positions along a longitudinal axis of said container, said container having one or more axially spaced axes extending transverse to said longitudinal axis, said apparatus comprising:
    flexible means extending along one of said transverse axes across said container uppermost edges of said for spanning said container at one of said positions;
    means for tensioning said flexible means to provide a platform at said position;
    means for defining a hinge rotatable on said flexible means, said hinge extending parallel to said longitudinal axis;
    means for providing said upper portion of said peak configuration, said providing means being connected to said hinge; and
    means for rotating said hinge on said platform to move said providing means above said horizontal plane and define said upper portion of said peak configuration.

2. Apparatus for selectively raising a cover for a vehicle, said raising being from a completely planar or partially planar cover configuration to a peaked cover configuration, said vehicle having opposite sides extending in a longitudinal axial direction to define a length of said vehicle and opposite ends extending in a transverse direction across said vehicle to define an open top container and a plane at tops of said sides and said ends, said apparatus comprising:
    an elongated web having a selected width in said axial direction and a length in said transverse direction sufficient to span said opposite sides, said web having opposite ends provided with extensions adapted to tightly secure said web to said container at a selectable position along the length of said container to form a transverse platform beneath said cover;
    an I-shaped cover lifter having a pivot bar provided with opposite ends, a web bar and a lifter bar, said pivot bar having a given length;
    said web having pairs of loops therein spaced axially from each other and centrally located between said sides, said loops being spaced by less than said given length to receive said opposite ends of said pivot bar and permit rotation thereof relative to said web from a position generally in said plane of said cover to a cover lifting position;
    a pull member adapted to extend under said cover and over said web and being connected to said cover lifter to rotate said pivot bar in said loops so that said lifter bar lifts said cover at said axial position; and
    a stop member connected between said web and said lifter bar to limit said rotation of said pivot bar relative to said web.

3. Apparatus according to claim 1, further comprising:
    said flexible means being fabric having a first resistance to being stretched axially on said axis transverse to said longitudinal axis;
    said tensioning step stretching said fabric on said transverse axis to provide said platform with a selected ability to withstand sagging in response to a vertical force less than a given maximum amount; and
    a cover initially in said plane over said open top, a peak portion of said cover being moved into said peak configuration by a lifting force from said providing means, said cover resisting said lifting force by less than said maximum amount.

4. Apparatus according to claim 1, further comprising:
    said providing means including a column connected to said hinge and a peak member connected to said column, said peak member and said hinge member being separated by a distance by which said peak configuration is to be above said horizontal plane.

5. Apparatus according to claim 1, further comprising:
    said rotating means including a stop member for limiting said rotation of said hinge member to an angle of more than ninety degrees from said flexible means;
    a cover above all of said flexible means, said defining means, said providing means and said rotating means, said cover closing said open top of said container, said cover being stretched into said peak configuration by said providing means, said cover being adapted to carry a load; and
    said flexible means sagging in response to said load and urging said stop member to rotate said hinge member back to a position at about ninety-degrees relative to said flexible means.

6. Apparatus according to claim 4, said container having a given length parallel to said longitudinal axis, further comprising:

said peak member extending parallel to said longitudinal axis and having a length substantially less than said given length of said container.

7. Apparatus according to claim 6, further comprising:

a plurality of said apparatus defined in claim 6, one said apparatus being at each of said selectable positions, said plurality of apparatus being effective when each said providing means is moved above said horizontal plane to form said peak configuration for a selected amount of said length of said container.

8. Apparatus according to claim 2, further comprising:

said lifter bar being provided with a length in said axial direction which is greater than said width of said web but substantially less than said length of said vehicle, said lifter bar in said position to lift said cover being in engagement with said cover and being stabilized in said axial direction by said cover.

9. Apparatus according to claim 2, further comprising:

said cover having a first characteristic of resistance to forces tending to stretch said cover;

said web being fabricated from a material having a second characteristic of resistance to forces tending to stretch said web, said second characteristic being more resistant to such forces than said first characteristic such that the same force applied to each of said web and said cover results in a greater amount of stretch of said cover than the amount of stretch of said web.

10. Apparatus for raising a cover into a peaked position, said cover being mounted over at least two top edges and opposite ends of a vehicle, said raising being into said peaked position from a completely planar cover configuration coincident with a plane defined by said top edges or from a partially planar cover configuration defined by both of said top edges and by load material carried by said vehicle wherein at least some of said load material extends above said top edges and prevents said cover from assuming said completely planar cover configuration, said opposite ends of said vehicle defining a length of said vehicle extending in a longitudinal axial direction, said apparatus comprising:

a flexible web having a width that is narrow relative to said length of the vehicle, said web having opposite ends, said web being extendable under said cover transversely of said longitudinal axis between said opposite top edges under tension to form a platform under said cover and generally in said plane and transversely between said top edges;

an elongated peak former having opposite ends; and a retainer secured to said web to receive one of said opposite ends of said peak former and permit movement of the other of said opposite ends of said peak former out of said plane and relative to said platform and against said cover to position said other opposite end of said peak former and said cover above said plane and cause at least a portion of said cover which was in said completely planar position to be in said peaked position.

11. Apparatus for raising a cover into a peaked position, said cover being mounted over at least two top edges and opposite ends of a vehicle, said raising being into said peaked position from a completely planar cover configuration coincident with a plane defined by said top edges or from a partially planar cover configuration defined by both of said top edges and by load material carried by said vehicle wherein at least some of said load material extends above said top edges and prevents said cover from assuming said completely planar cover configuration, said opposite ends of said vehicle defining a length of said vehicle extending in a longitudinal axial direction, said apparatus comprising:

a flexible web having a width that is narrow relative to said length of the vehicle, said web having opposite ends;

ties connectable to said opposite ends of said web and connectable to said container to position said web extending under said cover transversely of said longitudinal axis between said opposite top edges, said ties being connectable to tension said web to cause said web to form a platform under said cover and generally in said plane and transversely between said top edges;

an elongated peak formed having opposite ends;

a retainer secured to said web to receive one of said opposite ends of said peak former and permit movement of the other of said opposite ends of said peak former out of said lane; and a member connectable to said peak former and extendable under said cover to one of said top edges of said vehicle to move said opposite end of said peak former relative to said platform and against said cover to position said opposite end of said peak former and said cover above said plane and cause at least a portion of said cover which was in said completely planar position to be in said peaked position.

* * * * *